UNITED STATES PATENT OFFICE.

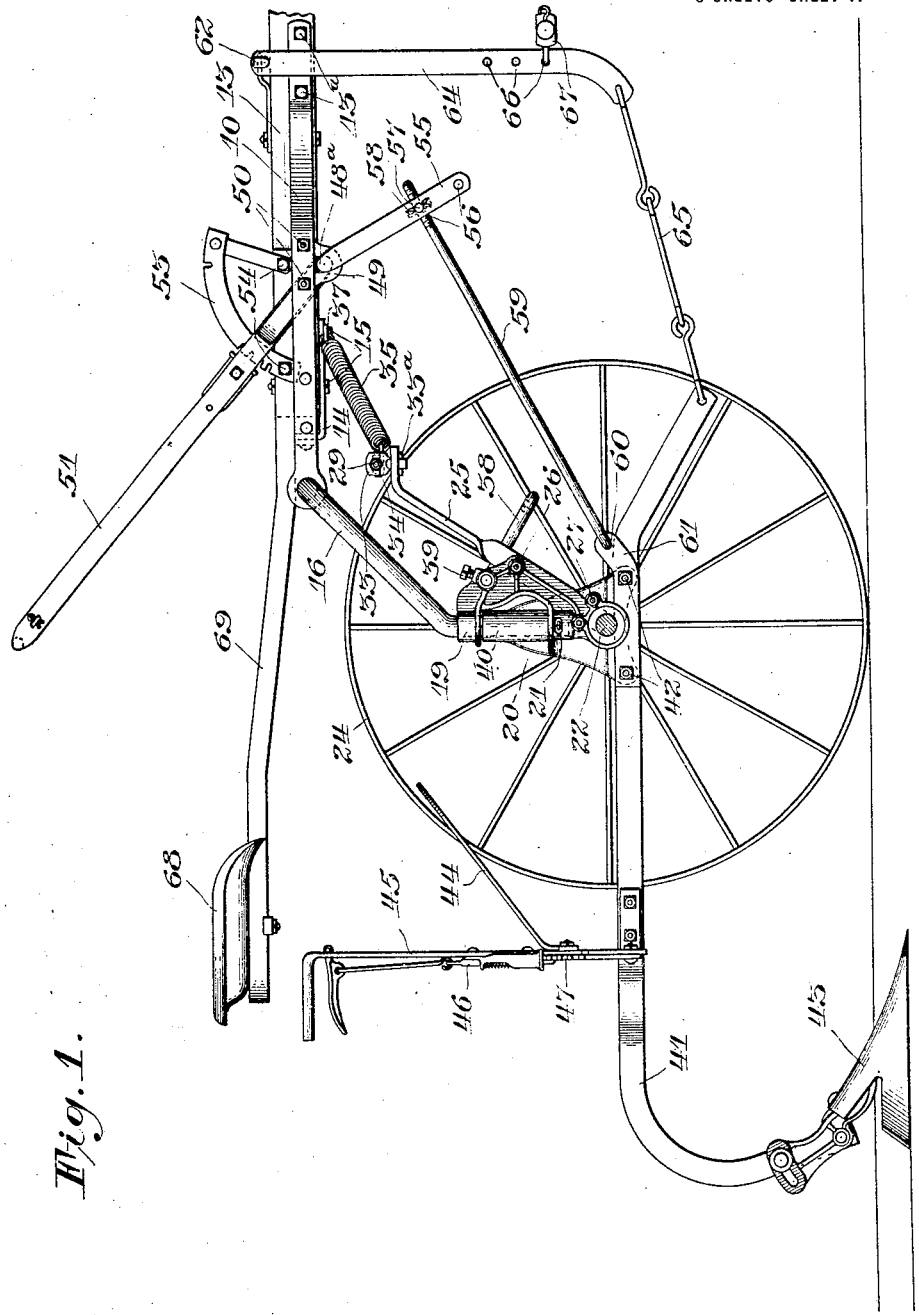

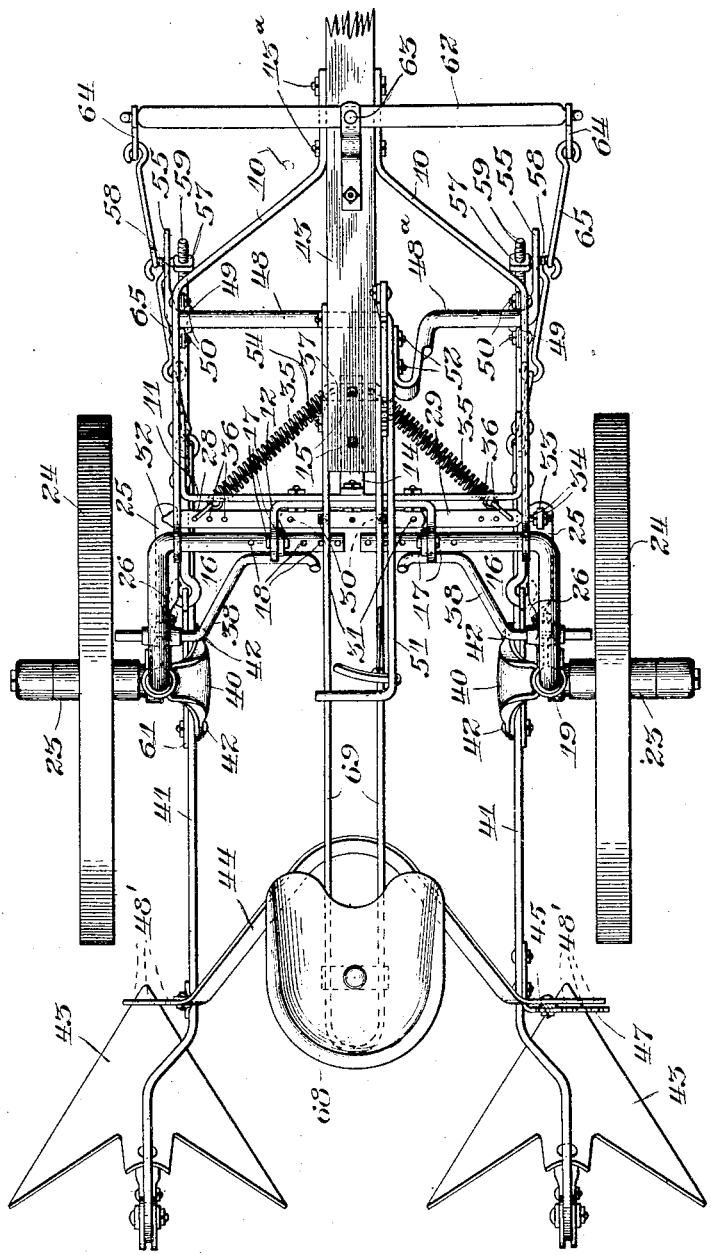

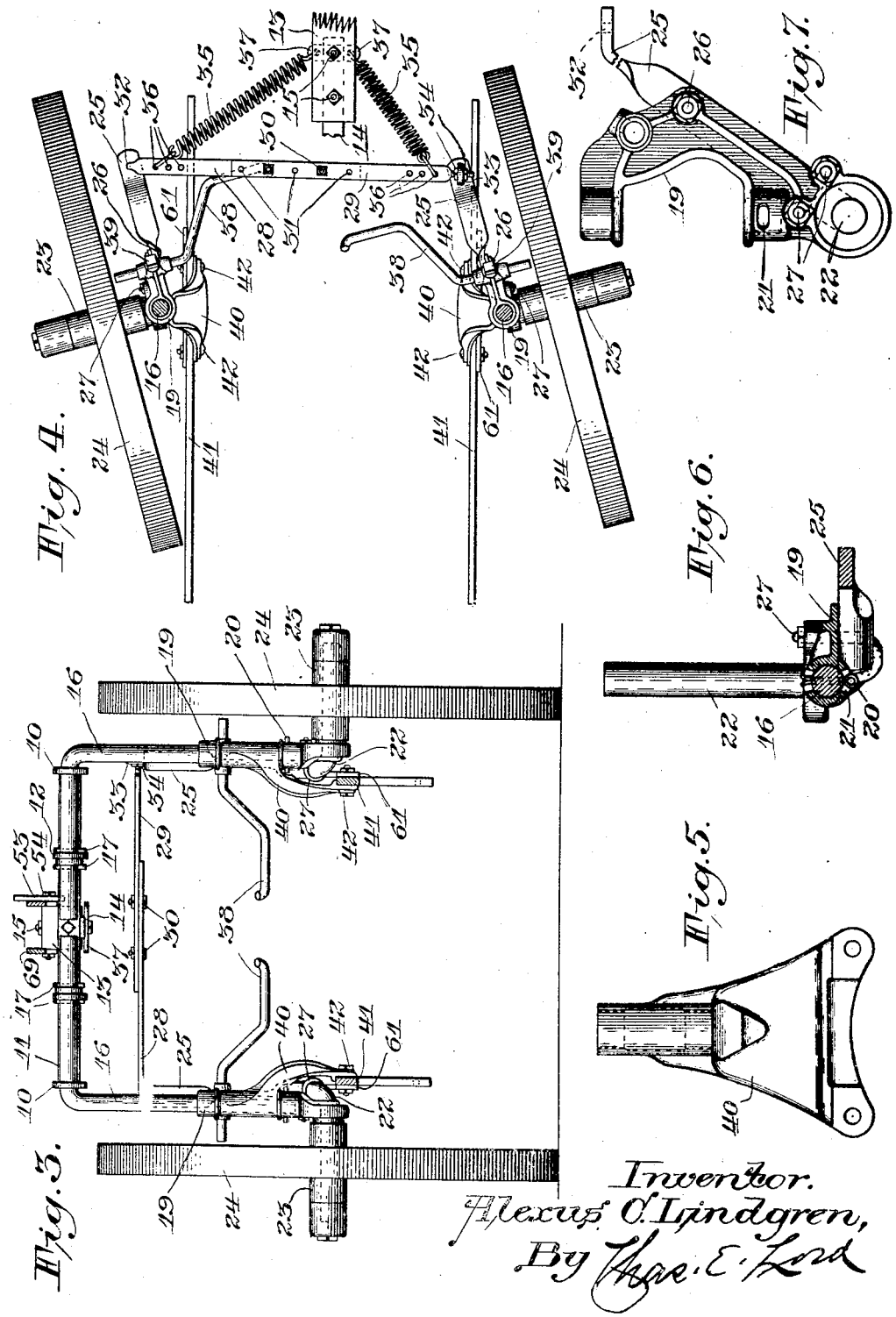

ALEXUS CONRAD LINDGREN, OF HAMILTON, ONTARIO, CANADA, ASSIGNOR, BY MESNE ASSIGNMENTS, TO INTERNATIONAL HARVESTER COMPANY, A CORPORATION OF NEW JERSEY.

CULTIVATOR.

1,354,315.   Specification of Letters Patent.   Patented Sept. 28, 1920.

Application filed October 12, 1917. Serial No. 196,317.

*To all whom it may concern:*

Be it known that I, ALEXUS C. LINDGREN, a citizen of the United States, residing at Hamilton, in the county of Wentworth and Province of Ontario, Dominion of Canada, have invented certain new and useful Improvements in Cultivators, of which the following is a full, clear, and exact specification.

This invention relates to improvements in culitvators, one object being to simplify construction and provide a cultivator which will completely cultivate two spaces between three rows, thereby being a two-row cultivator; also to provide means whereby the spacing of the shovels can be changed while the cultivator is in motion to accommodate unevenly spaced rows. This applies particularly to the use of cultivators to crops planted with three-row planters. The three rows are uniformly spaced while there often is a great variation between the outside of successive trips across the field. This condition is very hard to meet, and to meet it this cultivator was developed.

Another object is to provide a cultivator which allows the wheels to be freely turned when the cultivator shovels are lowered but which holds the wheels nearly rigid when the shovels are raised and which maintains the proper balance of the cultivator in both the raised and lowered positions.

Another object is to properly distribute the tractive force so that all parts receive the proper pull.

Another object is to provide one adjustment whereby the wheels and beams will accommodate different widths of plant rows such as rows planted 24″, 26″, 28″ or 30″ apart.

Another object is to provide foot operated means for guiding the cultivator in the row.

Another object is to provide spring means for automatically maintaining the wheels parallel to the tongue so that in running straight ahead the operator is relieved of the necessity of keeping his feet on the foot levers.

A further object is to provide a cultivator wherein the cultivator beams are allowed to swing with respect to the frame and tongue so that they will normally follow very nearly the course taken by the tongue except as they are independently guided by the wheels.

Another object is to simplify the operation as much as possible by reducing the number of operating levers to a minimum, the guiding of the cultivator in the row being done entirely by the feet.

With these and other objects in view, my invention consists in the novel arrangement and combination of parts described in the following specification and covered by the appended claims.

In the accompanying drawings—

Figure 1 is a side elevation of a cultivator embodying my invention, showing the right-hand wheel removed;

Fig. 2 is a plan view;

Fig. 3 is a rear elevation, partly in section;

Fig. 4 is a partial plan view showing the steering arrangement of the wheels;

Figs. 5, 6 and 7 are details of the swivel construction.

The frame consists of the side bars 10, the end bar 11, and the bracket 12, fastened together by means of bolts or rivets. At the forward end the frame is fastened to the tongue 13 by bolts 13ª, and at the rear end by means of a brace 14, which is fastened to the tongue by bolts 15.

The rear ends of the side bars 10 and the brackets 12 are journaled to receive the arch axle 16. These axles are secured against endwise movement by means of cotter pins 17 placed in holes 18 spaced along the arch axles. By placing the cotter pins in different sets of holes the distance between the wheels and shovels of each side may be varied to suit different spacing of the rows to be cultivated.

On the lower end of the arch bar 16 is fastened a bracket 19 by means of a cotter pin 20 (see Figs. 6 and 7) in a hole in the lower end of the arch axle. The elongated hole 21 in the bracket 19 allows the necessary movement of the bracket. Each bracket 19 carries a stub axle 22, on which is journaled a hub 23 of the wheel 24.

The stub axle is bent to form the arm 25, and both axle and arm are fastened to the bracket 19 by means of a bolt 26 and a U-bolt 27. The outer ends of these arms are joined by means of alining bars 28 and 29, which are fastened together by bolts 30 passing through holes 31 having the same spacing as the holes 18 in the arch axle 16. The spacer bar 28 has a hook fitting into a hole 32 in the left-hand arm 25, while the opposite end of the spacer bar 29 is screw threaded and is held by the thread in the swivel 33 and lock nut 34. The swivel 33 turns in the hole 32 of the arm 25, but is held therein by the cotter pin 33$^a$. Springs 35 are fastened at one end in holes 36 in the spacer bar and at the other end to a clip 37 held by one of the bolts 15 to the tongue 13. The spacer bar maintains the wheels in parallelism while the springs tend to keep them running true with the frame and tongue.

Each bracket 19 also carries a foot lever 38 which is held by a set screw 39. Between the two ends of the bracket 19 is loosely mounted on the axle another bracket 40, to which is fastened a cultivator beam 41 by means of bolts 42. Cultivator shovels 43 are suitably mounted on the rear end of the cultivator beam 41. The two cultivator beams 41 are connected near their rear ends by an arch 44 adjustably bolted to one cultivator beam and adjustably fastened to the other by means of a lever 45 carrying a spring operated detent 46 which engages a toothed segment 47. The arch 44 also has at each end a series of holes 48$^1$ having the same spacing as the holes 18 in the arch axles. The segment and lever permit the shovels being moved closer or farther apart as the brackets 40 are loose on the arch axles.

Lever 45 is also serviceable in laterally shifting the cultivator beams as a unit around the vertical parts of axles 16, thus permitting an independent and additional guiding feature over that provided for by the pivot wheel feature.

On the under side of the frame 10 is mounted a rock shaft 48 in hangers 49 bolted to the frame by the bolts 50. This shaft is operated by the lever 51, which is an extension of the shaft 48 and is fastened to the shaft 48$^a$ by bolts 52. Adjustment of the lever is secured by means of a hand operated detent on the lever engaging a notched segment 53 which is fastened to the tongue by bolts 54. At each end of the rock shaft is an arm 55 having holes 56 adapted to receive a swivel nut 57, which is held in place by a cotter pin 58.

A rod 59 has one end threaded to engage the swivel nut 57, while the other end is bent to engage the hole 60 of the strap 61, which is secured to the cultivator beam 41 by the bolts 42.

An equalizer bar 62 is fastened at its center to the tongue by a bolt 63, while at each end it carries a depending bar 64. At the lower end of the depending bar are mounted links 65, the other end of which is fastened to an extension of the cultivator beam 41. The depending bar has several holes 66 adapted to receive a swingletree 67. A seat 68 is secured to a U-bar 69 which is fastened to the tongue by the bolts 54.

From the foregoing description it will be apparent that when the lever 51 is moved to the forward position the arms 55 and rod 59 will rock the wheels and arch axle about the upper horizontal section of the latter as a fulcrum, thereby causing the cultivator wheels to be moved rearward and thereby balance the frame and at the same time cause the cultivator beams 41 and the shovels 43 to be raised.

Adjustment of the depth of the shovels may be made by setting the detent in any one of the teeth in the segment 53, and also by means of the threaded adjustment on the rod 59. The lift of the shovels may be varied by means of the holes 56 in the rock arm 55. When the shovels are raised the springs 35 become stretched and contribute very materially in keeping the wheels in alinement with the frame.

When the cultivator is in operation in the field the proper adjustment of the arch axles is made by means of the holes 18 to suit the width of the row. The same adjustment must then be made on the alining bars 28, 29 and the arch 44. Should there be a difference in width of rows, the distance between the shovels 43 may be changed by the operator by means of the hand lever 45 during the process of cultivation. The principal guiding means is in the pivot wheel connections whereby the wheels may be guided by the operator by means of the foot levers 38. Pushing the left-hand foot lever, for instance, to the position shown in Fig. 4, causes both wheels to be guided to the left. The wheels are always maintained parallel by means of the arms 25 and the alining bars 28, 29. At the same time the left-hand spring is tensioned while the right-hand spring is relieved, so that as soon as the operator's foot is removed from the foot lever 38, the spring 35 will draw the wheels back to their normal position; that is, parallel with the frame.

Cultivators are generally built with the cultivating device back of the center of gravity, and a common objection is that when these cultivating devices are raised the weight back of the center causes the tongue to raise. In this cultivator I have overcome this difficulty by so arranging the wheels with respect to the cultivating devices and the frame that as the cultivator beams are raised the wheels will automatically swing to the rear and restore the balance of the cultivator while the cultivator beams are raised.

Various changes may be made in the details of construction and arrangement of parts without departing from the spirit of the invention as covered by the appended claims.

What I claim as new is:

1. In a wheeled cultivator, a frame, a tongue mounted thereon, arch axles hingedly connected at their upper portion to the frame, hinged mountings carried by the lower portion of each arch axle, wheels journaled thereon, arms secured to the hinged mountings, an alining bar connecting said arms, a cultivator beam attached to the lower portion of each arch axle, and means for adjusting the arch axles and beams at various positions to position the cultivator beams and wheels.

2. In a wheeled cultivator, a frame, a tongue mounted thereon, arch axles hingedly connected at their upper portion to the frame, hinged mountings carried by the lower portion of the arch axles, wheels journaled thereon, arms secured to the hinged mountings, a spacer bar connecting said arms, springs attached to the arms which tend to maintain the wheels in alinement with the frame, a cultivator beam attached to the lower portion of each arch axle, and means for adjusting the arch axle and the beam at various positions to position the cultivator shovels and wheels.

3. In a wheeled cultivator, a frame, a tongue mounted thereon, arch axles hingedly connected at their upper portion to the frame, hinged mountings carried by the lower portion of the arch axles, wheels journaled thereon, arms secured to the hinged mountings, a spacer bar connecting said arms, springs attached to the arms which tend to maintain the wheels in alinement with the frame, means for steering the wheels, a cultivator beam attached to the lower portion of each arch axle, and means for adjusting the arch axle and beams at various positions to position the cultivator shovels and wheels.

4. In a wheeled cultivator, a frame, a tongue mounted thereon, arch axles hingedly connected at their upper portion to the frame, hinged mountings carried by the lower portion of each arch axle, wheels journaled thereon, arms secured to the hinged mountings, a spacer bar connecting said arms, springs attached to the arms which tend to maintain the wheels in alinement with the frame, foot levers attached to the hinged mountings, a cultivator beam attached to the lower portion of each arch axle, and means for adjusting the arch axle and beams at various positions to position the cultivator shovels and wheels.

5. In a wheeled cultivator, a frame, a tongue mounted thereon, arch axles hingedly connected at their upper portion to the frame, hinged mountings carried by the lower portion of each arch axle, wheels mounted thereon, automatic means for maintaining alinement of the wheels with the frame, a cultivator beam attached to the lower portion of each arch axle, and means for adjusting the arch axle and beams at various positions to position the cultivator shovels and wheels.

6. In a wheeled cultivator, a frame, a tongue mounted thereon, an arch axle hingedly connected at its upper portion to the frame, hinged mountings carried by the lower portions of the arch axle, wheels mounted thereon, arms secured to the hinged mountings, a spacer bar connecting said arms, springs secured to the arms which tend to maintain the wheels in alinement with the frame, a rock shaft mounted on the frame, a lever for operating the rock shaft, and arms on the shaft, adjustable link connections between said arms and the lower ends of the arch axle whereby the arch axle may be adjusted to raise and lower the cultivator beams.

7. In a wheeled cultivator, a frame, and an arch axle hingedly mounted on the frame, each lower end of the arch axle having mounted thereon a bracket carrying a cultivator beam and a bracket carrying a wheel, each bracket adapted to be swung on the arch axle independently of the other, and means for swinging the arch axle in a longitudinal direction with respect to the frame.

8. In a wheeled cultivator, a frame, and an arch axle hingedly mounted on the frame, each lower end of the arch axle having mounted thereon a bracket carrying a cultivator beam and a bracket carrying a wheel, each bracket adapted to be swung on the arch axle independently of the other, an alining bar operatively connecting the wheel brackets, springs between the ends of the alining bar and the frame, and means for swinging the arch axle about the frame.

In testimony whereof I affix my signature.

ALEXUS CONRAD LINDGREN.

Witnesses:
K. MARTIN,
REBA MEYERS.